Patented Oct. 7, 1941

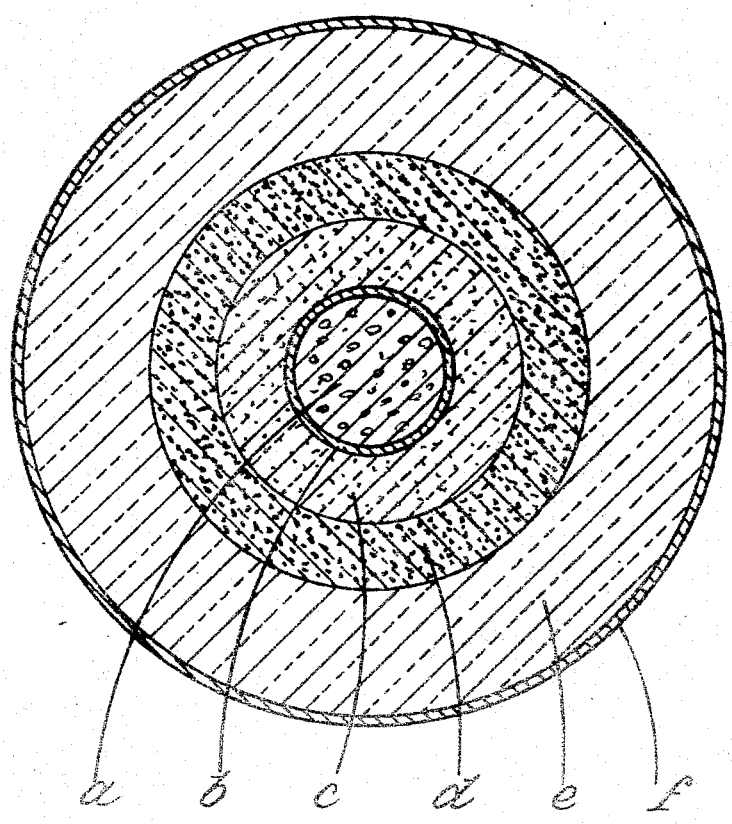

2,258,333

UNITED STATES PATENT OFFICE 2,258,333

MANUFACTURE OF GOLF BALLS AND THE LIKE

Ellis Miller, Brussels, Belgium

Application September 25, 1937, Serial No. 165,643
In Great Britain September 8, 1937

7 Claims. (Cl. 273—62)

In the manufacture of golf and like balls it is known to provide a core of rubber or similar material which is wound around with rubber thread or tape, under tension, to the required size and afterwards enclosed in a gutta percha or like cover which is vulcanized in position.

The object of the present invention is to provide an improved ball for light hitters for whom a ball with good rolling properties is desirable. In accordance with this invention a ball has a core proper consisting of a mixture of granulated cork, preferably paraffin treated, rubber and kauri resin. Preferably this core is enclosed first in a layer of rubber, then in a layer consisting of a mixture of rubber, granulated nickel and kauri resin, then in a similar layer containing more nickel and the core thus produced is afterwards wound and covered in the usual manner.

The core proper preferably consists of finely granulated cork the surface of which is impregnated with paraffin wax, rubber and a small quantity of kauri resin to serve as a binder. The layers of rubber, granulated nickel and kauri resin are preferably prepared by heating a mixture of rubber and kauri resin to about 130° C., adding granulated pure nickel, stirring the mixture and then moulding.

One form of golf ball made according to the present invention is illustrated by the accompanying drawing which is a central section.

$a$ is the core proper 9.0 mm. in diameter, weighing 0.2 gramme and consisting of finely granulated cork superficially impregnated with paraffin wax, mixed with rubber and a small quantity of kauri resin as a binder and heated to fuse the kauri resin. $b$ is a surrounding layer of rubber 0.5 mm. thick and weighing 0.5 gramme. $c$ is a second surrounding layer consisting of a mixture of rubber, granulated pure nickel and kauri resin, prepared as above; this layer is applied by means of a mould, the core proper being disposed centrally therein, it is 4.0 mm. thick bringing the diameter of the whole core up to 18 mm. and its weight to 4.7 grammes, but the quantity of nickel in this layer may be varied in accordance with requirements. $d$ is a third surrounding layer which is similar to the layer $c$ but contains more nickel bringing up the weight of the whole core to from, say, 15 to 19 grammes and its diameter to 26 mm. The whole core is afterwards wound with rubber thread or tape $e$ and covered, as at $f$, in the usual manner.

It is to be understood that the proportions of the materials employed in the core proper and in the respective layers and the thickness of the layers may be varied according to requirements.

I claim:

1. A ball having a solid, substantially homogeneous molded core proper consisting of a mixture of granulated cork, rubber and kauri resin.

2. A ball having a solid, substantially homogeneous molded core proper consisting of a mixture of granulated cork, rubber and kauri resin surrounded by a layer of rubber.

3. A ball having a solid, substantially homogeneous molded core proper consisting of a mixture of granulated cork, rubber and kauri resin, the granulated cork being paraffin treated.

4. A ball having a solid, substantially homogeneous molded core proper consisting of a mixture of granulated cork, rubber and kauri resin surrounded by a layer of rubber, the granulated cork being paraffin treated.

5. A ball having a solid, substantially homogeneous molded core proper consisting of a mixture of granulated cork, rubber and kauri resin surrounded by successive layers of ($a$) rubber and ($b$) a molded mixture of rubber, granulated nickel and kauri resin.

6. A ball having a solid, substantially homogeneous molded core proper consisting of a mixture of granulated cork, rubber and kauri resin surrounded by successive layers of ($a$) rubber, ($b$) a molded mixture of rubber, granulated nickel and kauri resin and ($c$) a mixture similar to that of the layer ($b$) but containing more nickel.

7. A ball having a solid, substantially homogeneous molded core proper consisting of a mixture of granulated cork, rubber and kauri resin surrounded by successive layers of ($a$) rubber, ($b$) a molded mixture of rubber, granulated nickel and kauri resin, ($c$) a mixture similar to that of the layer ($b$) but containing more nickel, ($d$) strip rubber wound under tension and ($e$) gutta percha constituting an outer cover.

ELLIS MILLER.